Sept. 17, 1963    HANS-JOACHIM M. FOERSTER    3,103,832
PLANETARY GEAR, CHANGE-SPEED TRANSMISSION
Filed May 11, 1959
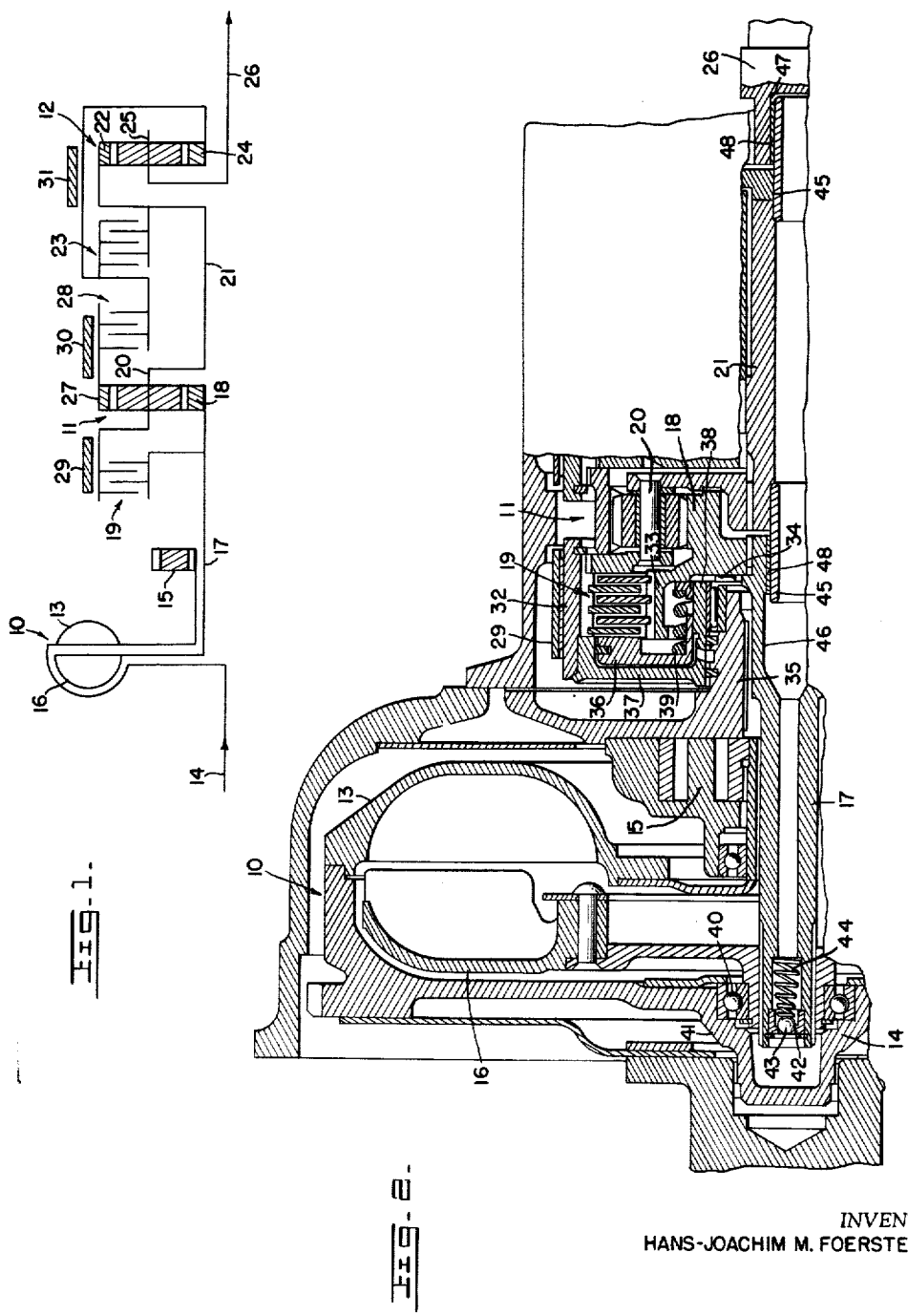
INVENTOR
HANS-JOACHIM M. FOERSTER
BY *Dicke, Craig + Freudenberg*
ATTORNEYS United States Patent Office 3,103,832
Patented Sept. 17, 1963

3,103,832
PLANETARY GEAR, CHANGE-SPEED
TRANSMISSION
Hans-Joachim M. Foerster, Stuttgart-Bad Cannstatt, Germany, assignor to Daimler-Benz Aktiengesellschaft, Stuttgart-Unterturkheim, Germany
Filed May 11, 1959, Ser. No. 812,489
Claims priority, application Germany May 22, 1958
23 Claims. (Cl. 74—759)

The present invention relates to a change-speed transmission, especially for motor vehicles, provided with a mechanical change-speed section including two planetary gear sets and with a hydrodynamic device operatively connected ahead of the mechanical change-speed gear section. More particularly, the present invention relates to a change-speed transmission especially for motor vehicles, provided with two planetary gear sets and a hydrodynamic device connected ahead of the two planetary gear sets as illustrated, for example, in my German Patent 925,928 of March 31, 1955, in which the sun gear of the first planetary gear set constitutes the input of the change-speed transmission and the planet carrier of the second planetary gear set the output of the change-speed transmission whereas the planet carriers of the first planetary gear set are operatively connected for common rotation with the ring gear of the second planetary gear set and are adapted to be braked, and the other transmission elements are adapted to be selectively braked as well as adapted to be selectively connected with each other and with the ring gear of the second planetary gear set.

In the devices of the prior art, as exemplified in my German Patent 925,928, a hydrodynamic torque converter is normally used, the driven or turbine wheel of which is operatively connected with the sun gear of the first planetary gear set. Furthermore, in the prior art devices of this type, a by-pass clutch is provided which is operatively connected between the input or drive shaft and the planet carrier of the first planetary gear set. Consequently, in the use of such a prior art arrangement, the torque converted is by-passed in the two higher speeds, namely in the third or fourth speed thereof. However, the by-passing of the torque converter in the higher speeds such as the third and fourth speed, i.e., the fact that the engagement of the by-pass clutch in the third and fourth speed of such a transmission renders the torque converter effectively inoperative in those higher speeds, has proved itself disadvantageous because it is, in particular, in these two higher speeds that an increased frequency of the necessity to shift takes place and the shocks occurring during the shifting then cannot be damped or absorbed to a large extent by a hydrodynamic device operatively connected in the path of the transmission of torque.

The present invention aims at the elimination of the disadvantages of such prior art devices as well as at a simplification in the construction of the transmission. The problems and shortcomings encountered in these prior art devices are solved and eliminated in accordance with the present invention by providing, in the types of transmission mentioned hereinabove, a hydrodynamic coupling the driven or turbine wheel of which is operatively connected for common rotation with the sun gear of the first planetary gear set and simultaneously therewith is adapted to be selectively connected with the planet carrier of the first planetary gear set by means of a disengageable clutch.

By the use of a construction in accordance with the present invention, the by-pass clutch used in the prior art devices may be dispensed with so that the transmission of torque takes place in all speeds of the transmission through the hydrodynamic coupling and the shifting shocks, especially also in the two higher speeds, are absorbed or damped by the hydrodynamic coupling. Furthermore, the use of a hydrodynamic coupling offers the advantage of a more simple construction and less expensive manufacture thereof. The slippage which occurs in the hydrodynamic coupling is of little importance when compared to the advantages mentioned hereinabove which may be achieved thereby.

The construciton of one embodiment in accordance with the present invention utilizes, as disengageable clutch, a friction-disk clutch, known per se, of which the outer carrier or support member for the friction disks is operatively connected with the planet carrier of the first planetary gear set and simultaneously therewith constitutes the brake drum for the selectively engageable brake adapted to selectively brake thereby the planet carrier of the first planetary gear set. The inner carrier or support member for the friction disks of this clutch consists appropriately of one piece with the sun gear of the first planetary gear set, for instance, by being integral therewith, and is mounted on or secured to the transmission input shaft to which is also secured the driven wheel or turbine wheel of the hydrodynamic coupling. A splined connection or any other suitable connection may thereby be used between this transmission input shaft, on the one hand, and the driven member of the hydrodynamic coupling and the sun gear of the first planetary gear set, on the other.

The transmission input shaft is thereby appropriately constructed as a hollow shaft and is supported in a manner, known per se, for example, by means of appropriate bearings within the driving or input part of the hydrodynamic coupling. The hollow transmission input shaft is provided at the end thereof adjacent the driving part of the hydrodynamic device with a central ball-type check valve which is operative to maintain at all times a predetermined minimum pressure in the hydrodynamic coupling.

A hollow connecting shaft serves for purposes of connecting the carrier of the first planetary gear set with the ring gear of the second planetary gear set which hollow connecting shaft is provided at both ends thereof with bushings securely emplaced or inserted therein. The hollow connecting shaft is inserted by means of these bushings into corresponding recesses of the transmission input and transmission output shafts whereby additional bearing bushings may be inserted into these two last-mentioned shafts.

Accordingly, it is an object of the present invention to provide a change-speed transmission provided with two planetary gear sets and a hydrodynamic device which obviates the disadvantages of the prior art constructions.

It is another object of the present invention to provide a change-speed transmission having two planetary gear sets and a hydrodynamic device which is so constructed and arranged as to make possible a transmission of torque through the hydrodynamic device in all speeds.

Still another object of the present invention resides in the provision of a change-speed transmission including a plurality of planetary gear sets and a hydrodynamic device operatively connected ahead of the planetary gear sets which obviates the necessity for a bypass clutch adapted to bypass the hydrodynamic device.

A further object of the present invention resides in the provision of a change-speed transmission in which the shifting shocks may be damped or absorbed to a large extent in all speeds thereof in the hydrodynamic device operatively included in the path for the transmission of torque in all the speeds.

Still another object of the present invention resides in the provision of a change-speed transmission provided with a hydrodynamic device and two planetary gear sets which is relatively simple in construction, inexpensive in manufacture, especially insofar as the hydrodynamic device is concerned, and which makes possible a reduction of the over-all dimensions of the change-speed transmission.

These and other objects, features and advantages of the present invention will become more obvious from the following description when taken in connection with the accompanying drawing, which shows, for purposes of illustration only, one embodiment in accordance with the present invention, and wherein:

FIGURE 1 is a schematic diagrammatic view of a change-speed transmission in accordance with the present invention; and FIGURE 2 is a partial longitudinal axial cross-sectional view through the change-speed transmission of FIGURE 1 in accordance with the present invention.

Referring now to the drawing, wherein like reference numerals are used throughout the two views to designate corresponding parts, reference numeral 10 generally designates a hydrodynamic coupling. The change-speed transmission in accordance with the present invention includes, in addition to the hydrodynamic coupling 10, two planetary gear sets generally designated by reference numerals 11 and 12 which are operatively connected into the path of the transmission of torque within the change-speed transmission behind the hydrodynamic coupling 10. The primary or impeller member 13 of the hydrodynamic coupling 10 is driven from the drive shaft designated by reference numeral 14 which may be, for example, the crankshaft of the engine and simultaneously therewith serves for purposes of driving the primary oil pump 15 for the oil circulatory system which is provided for the automatic shifting as well as for the lubrication of the transmission. The primary oil pump 15 may be of any suitable construction, for example, a gear pump well known in the art. Furthermore, the automatic shifting which may be hydraulic, mechanical or electrical in nature or any combination thereof, may take place in any suitable manner, for example, in dependence on the engine speed and vehicle speed, and/or in dependence on the position of the gas pedal or throttle of the engine, and/or in dependence on the torque output of the engine, as evidenced, for example, by the vacuum in the intake manifold or by the position of the adjusting rack of a fuel injection pump, in case a fuel injection system is used for the engine. A secondary oil pump (not shown) may be driven in any suitable manner in proportion to the vehicle speed.

The secondary or driven member 16 of the hydrodynamic coupling 10 is operatively connected by means of a hollow shaft 17 with the sun gear 18 of the first planetary gear set 11 and simultaneously therewith over a disengageable clutch, generally designated by reference numeral 19, with the planet carrier 20 of the first planetary gear set 11. The planet carrier 20 is operatively connected over a hollow connecting shaft 21 with the ring gear 22 of the second planetary gear set 12 and, simultaneously therewith, is adapted to be selectively connected also with the sun gear 24 of the second planetary gear set 12 by means of a disengageable clutch, generally designated by reference numeral 23. The planet carrier 25 of the second planetary gear set 12 constitutes the output or driven member of the change-speed transmission and is, therefore, operatively connected with the transmission output shaft 26. The ring gear 27 of the first planetary gear set 11 is adapted to be selectively connected with the sun gear 24 of the second planetary gear set 12 by means of a disengageable clutch, generally designated by reference numeral 28 and simultaneously therewith over the already mentioned clutch 23, also with the ring gear 22 of the second planetary gear set 12.

A brake 29 of any suitable construction serves for purposes of braking the planet carrier 20 of the first planetary gear set 11 to keep the same stationary, and therewith simultaneously also serves as brake for the ring gear 22 of the second planetary gear set 12. The ring gear 27 of the first planetary gear set 11 is adapted to be selectively braked by means of a brake 30 and the sun gear 24 of the second planetary gear set 12 is adapted to be selectively braked by a further brake 31.

As illustrated in FIGURE 2, the disengageable clutch 19 is constructed as friction disk clutch. The outer friction disk carrier or support member 32 of this clutch 19 serves simultaneously as drum member for the band brake 29 and is operatively connected in any suitable manner with the planet carrier 20 of the first planetary gear set 11 for common rotation therewith. The inner friction disk carrier or support member 33 of clutch 19 is formed integrally or is made in one piece with the sun gear 18 of the first planetary gear set 11. This integral sun gear, clutch half construction 18, 33 is mounted on the transmission shaft 17 in any suitable manner to provide common rotation between the transmission input shaft 17 and sun gear 18, for example, by a splined connection. The sun gear 18 of the first planetary gear set 11 is further supported against the stationary housing part 35 by means of an axial bearing 34 in order to absorb the axial forces which occur as a result of the inclined teeth thereof.

A ring or annular piston member 36 which is arranged in an annular cylinder and adapted to be hydraulically actuated against the force of a spring 39 serves for purposes of actuating the clutch 19. The annular cylinder is formed by a disk member 37 secured at the outer friction disk carrier 32; the disk member 39 passes over into a hub portion 38 or is operatively connected with such hub portion 38 along the inner end thereof whereby hub portion 38 is suitably supported by means of appropriate bearings on the transmission housing.

The transmission input shaft 17 is constructed as a hollow shaft and supported in the driving part 41 of the change-speed transmission by means of a bearing 40. The bearing 40 may be so constructed as to absorb simultaneously the radial and axial forces. However, the bearing 40 may also be constructed only as radial bearing. A central valve seat 42 is arranged at the forward end of the transmission input shaft 17, i.e., at the left end thereof as viewed in FIGURE 2, which is sealed off by means of a ball member 43 spring loaded by means of a valve spring 44. The valve structure 42, 43, 44 permits the discharge of oil or of any other hydraulic medium out of the hydrodynamic coupling 10 only with a predetermined pressure prevailing within the hydrodynamic coupling 10. As a result of this construction, a minimum pressure is maintained in the hydrodynamic coupling at all times. Upon reaching this minimum pressure, the valve member 43 is opened whereupon the hydraulic medium or oil may reach into the planetary change-speed transmission through the hollow input shaft 17 where it is used for purposes of lubricating the various mechanical change-speed transmission elements.

An intermediate shaft 21 operatively connects the planet carrier 20 of the first planetary gear set 11 with the ring gear 22 of the second planetary gear set 12 and is also constructed as a hollow shaft. The intermediate shaft 21 is provided at both ends thereof with bushings 45 which are pressed into the shaft 21 or are securely inserted therein in any other suitable manner. The intermediate shaft 21 is emplaced by means of the bushings 45 into corresponding recesses 46 and 47 of the transmission input shaft 17 and of the transmission output shaft 26, respectively. Furthermore, additional bearing bushings 48 of any suitable bearing material may be provided within the two last-mentioned shafts 17 and 26 intermediate bushings 45 and shafts 17 and 26, respectively.

It may also be appropriate to construct the clutches 19, 23 and 28 of similar elements. The number of friction disks may thereby be varied in these clutches 19, 23 and 28 so as to take into consideration the different amounts of torque which must be transmitted by the respective clutches. Both planetary gear sets 11 and 12 may also be made of identical gear wheels or elements. However, in most cases it is preferable to utilize different sizes of gears in the two planetary gear sets 11 and 12 in order to obtain the particular desired transmission ratios.

The transmission in accordance with the present invention provides four forward speeds and a reverse speed whereby in all of these speeds the hydrodynamic coupling 10 is operatively connected in the transmission of torque.

OPERATION

The transmission in accordance with the present invention operates as follows:

First Speed

The first speed in the transmission in accordance with the present invention is obtained by engaging the brakes 30 and 31 whereby, in both planetary gear sets 11 and 12, a speed reduction takes place. All clutches 19, 28 and 23 are thereby disengaged.

Second Speed

For purposes of obtaining second speed, the brake 30 remains engaged and, in the place of brake 31 which is now disengaged, the clutch 23 is engaged. As a result thereof, the second planetary gear set 12 is locked in itself so that a speed reduction occurs only in the first planetary gear set 11.

Third Speed

For purposes of obtaining the third speed, the brake 30 and the clutch 23 are disengaged and the clutch 19 and the brake 31 are engaged. As a result thereof, the first planetary gear set 11 is locked up in itself and a speed reduction takes place only in the second planetary gear set 12.

Fourth Speed

In order to obtain the fourth speed the clutch 19 remains engaged, and the clutch 23 is engaged in the place of brake 31 which is now disengaged. As a result thereof, both planetary gear sets 11 and 12 are locked in themselves and rotate in unison. Consequently, the drive or transmission of torque takes place over the hydrodynamic coupling 10 in direct drive.

Reverse Speed

The reverse speed is obtained by engaging the brake 29 and the clutch 28. Consequently, the planet carrier 20 of the first planetary gear set 11 and the ring gear 22 of the second planetary gear set 12 are braked. As a result thereof, a reversal of the direction of rotation takes place in the first planetary gear set 11 together with a speed reduction in the first planetary gear set 11 whereas the second planetary gear set 12 produces a further speed reduction while maintaining the reverse rotation of direction obtained in the first planetary gear set 11.

In order to facilitate the understanding of the operation of the change-speed transmission in accordance with the present invention, the following diagrammatic tabulation of the shifting operations may be helpful:

| Speed | Clutches | | | Brakes | | |
|---|---|---|---|---|---|---|
| | 19 | 23 | 28 | 29 | 30 | 31 |
| First | | | | | eng | eng |
| Second | | eng | | | eng | |
| Third | eng | | | | | eng |
| Fourth | eng | eng | | | | |
| Reverse | | | eng | eng | | |

While I have shown and described one embodiment in accordance with the present invention, it is understood that the same is not limited thereto but is susceptible of many changes and modifications within the spirit and scope thereof, and I, therefore, do not wish to be limited to the details described and shown herein but intend to cover all such changes and modifications as are encompassed by the scope of the appended claims.

I claim:

1. A change-speed transmission, especially for motor vehicles, including two planetary gear sets providing four forward speeds and a reverse speed and a hydrodynamic device having a driving member and a driven member and operatively connected ahead of said planetary gear sets comprising a transmission input shaft, a first planetary gear set having a plurality of transmission elements including a sun gear, a ring gear, at least one planet gear in meshing engagement with said sun gear and said ring gear, and a planet carrier for said last-mentioned planet gear, said transmission input shaft being operatively connected with the sun gear of said first planetary gear set, a second planetary gear set having a plurality of transmission elements including a sun gear, a ring gear, at least one planet gear in meshing engagement with said last-mentioned sun and ring gears, and a planet carrier for said last-mentioned planet gear, a transmission output shaft operatively connected with the planet carrier of said second planetary gear set, means operatively connecting the planet carrier of said first planetary gear set with the ring gear of said second planetary gear set, input means operatively connected with said driving member, said driven member being operatively connected with said transmission input shaft, and a plurality of selectively engageable means operatively associated with at least some of the transmission elements of said first and second planetary gear sets to enable selective engagement in each of said gear sets of a lock-up drive and of a non-direct drive, respectively, independently of the engagement condition of the other gear set including selectively engageable brake means operative to effectively brake both the planet carrier of said first planetary gear set and the ring gear of said second planetary gear set, further selectively engageable means operable in both directions of rotation for selectively connecting with each other or braking at least some of the other transmission elements of said first and second planetary gear sets to thereby enable obtaining said four forward speeds, and additional engageable means operatively connecting said driven member and said transmission input shaft with the planet carrier of said first planetary gear set to thereby provide a direct drive connection from said driven member to the second planetary gear set through said first planetary gear set upon engagement of said last-mentioned engageable means.

2. A change-speed transmission, especially for motor vehicles, provided with two planetary gear sets and a hydrodynamic device having a driving member and a driven member and operatively connected ahead of said planetary gear sets comprising a transmission input shaft, a first planetary gear set comprising a sun gear, a ring gear, at least one planet gear in meshing engagement with the sun gear and said ring gear and a planet carrier for said last-mentioned planet gear, said transmission input shaft being operatively connected with said sun gear of said first planetary gear set, a second planetary gear set including a sun gear, a ring gear, at least one planet gear in meshing engagement with said last-mentioned sun and ring gears, and a planet carrier for said last-mentioned planet gear, a transmission output shaft operatively connected with the planet carrier of said second planetary gear set, means operatively connecting the planet carrier of said first planetary gear set with the ring gear of said second planetary gear set, input means operatively connected with said driving member, said driven member being operatively connected with said transmission input shaft, and a plurality of selectively engageable means operatively associated with said first and second planetary gear sets to enable selective engagement in each of said gear sets of a lock-up drive and a non-direct drive, respectively, independently of the engagement condition of the other gear set including selectively engageable brake means operative to effectively brake both the planet carrier of said first planetary gear set and the ring gear of said second planetary gear sets, further selectively engageable means operable in both directions of rotation for selectively connecting with each other or braking the other elements of said first and second planetary gear sets including the ring gear of said first planetary gear set, the ring gear of said second planetary gear set and the sun gear of said second planetary gear set, and additional engageable means operatively connecting said driven member and said transmission input shaft with the planet carrier of said first planetary gear set to thereby provide a direct drive connection from said driven member to the second planetary gear set through said first planetary gear set upon engagement of said last-mentioned engageable means.

3. A change-speed transmission according to claim 1, wherein at least some of said selectively engageable means are friction disk clutches made of identical elements and having varying numbers of friction disks depending on the maximum torque to be transmitted thereby.

4. A change-speed transmission realizing four forward speeds and a reverse speed, especially for motor vehicles, provided with two planetary gear sets and a hydrodynamic coupling having a driving member and a driven member and operatively connected ahead of said planetary gear sets comprising a transmission input shaft, a first planetary gear set including a sun gear, a ring gear, at least one planet gear in meshing engagement with said last-mentioned sun and ring gears, and a planet carrier for said last-mentioned planet gear, said transmission input shaft being operatively connected with said sun gear of said first planetary gear set, a second planetary gear set including a sun gear, a ring gear, at least one planet gear in meshing engagement with said last-mentioned sun and ring gears, and a planet carrier for said last-mentioned planet gear, a transmission output shaft operatively connected with the planet carrier of said second planetary gear set, means operatively connecting the planet carrier of said first planetary gear set with the ring gear of said second planetary gear set, and further means for selectively engaging said four forward speeds and said reverse speed including first brake means operative to brake the planet carrier of said first planetary gear set and the ring gear of said second planetary gear set, first engageable means for selectively connecting in both directions of rotation the ring gear of said first planetary gear set with the sun gear of said second planetary gear set, second brake means for the ring gear of said first planetary gear set and the sun gear of said second planetary gear set, input means operatively connected with said driving member, said driven member being operatively connected with said transmission input shaft, and second engageable means for selectively connecting said driven member and therewith said transmission input shaft with the planet carrier of said first planetary gear set to thereby provide a direct drive connection from said driven member to the second planetary gear set through said first planetary gear set upon engagement of said second engageable means.

5. A change-speed transmission according to claim 4, wherein said second engageable means is a friction disk clutch including an outer drum-shaped member for the support of the friction disks thereof and an inner drum-shaped member for the support of the friction disks thereof, said outer drum-shaped member being operatively connected with the planet carrier of said first planetary gear set and simultaneously constituting the brake drum for said first brake means.

6. A change-speed transmission according to claim 15, wherein said inner support member is formed in one piece with said sun gear of said first planetary gear set.

7. A change-speed transmission according to claim 14, wherein said second engageable means is a friction-disk clutch provided with an outer friction disk support member and an inner friction disk support member, and wherein said inner friction disk support member is formed integrally with the sun gear of said first planetary gear set.

8. A change-speed transmission according to claim 7, wherein said inner support member and said first transmission element of said first planetary gear set integrally formed therewith is secured for common rotation with said first connecting means, said transmission including transmission housing means, and axial bearing means for supporting said first transmission element of said first planetary gear set against said transmission housing means on the side thereof facing said driven member.

9. A change-speed transmission according to claim 14, wherein said transmission input shaft is constructed as a hollow shaft, bearing means for supporting said hollow shaft within said hydrodynamic device, and release valve means arranged at the end of said hollow shaft near said bearing means to maintain a minimum pressure of the fluid medium within said hydrodynamic device.

10. A change-speed transmission according to claim 14, wherein said first-mentioned connecting means includes a torque-transmitting hollow shaft, wherein said input means and said output means are shafts provided with recesses, and bushing means inserted into said recesses to support said hollow shaft near both ends thereof on said input means and on said output means.

11. A change-speed transmission according to claim 10, further comprising bearing bushing means intermediate said first-mentioned bushing means and said input means and output means to thereby support said hollow shaft on said input and output means over said first-mentioned bushing means and said bearing bushing means.

12. A change-speed transmission according to claim 5, wherein said inner drum-shaped member and said sun gear of said first planetary gear set are formed integrally with each other, and axial bearing means for supporting said sun gear of said first planetary gear set in said transmission.

13. A change-speed transmission according to claim 4, further comprising bearing means for supporting said transmission input shaft within said hydrodynamic coupling, said transmission input shaft being formed as a hollow shaft and being in communication with the working chamber of said hydrodynamic coupling, and ball-type valve means operatively connected near the end of said transmission input shaft adjacent said bearing means for maintaining a minimum pressure of the fluid medium within said working chamber.

14. A change-speed transmission according to claim 4, further comprising engageable means for selectively connecting the sun gear and ring gear of said second planetary gear set with each other, said second brake means including brake means for the sun gear of said second planetary gear set and brake means for the ring gear of said first planetary gear set.

15. A change-speed transmission according to claim 14, wherein said engageable means are friction disk clutches made of identical elements and including differing numbers of friction disks to take into consideration the amount of torque to be transmitted by the individual clutch.

16. A change-speed transmission according to claim 4, wherein said means operatively connecting the planet carrier of said first planetary gear set with the ring gear of said second planetary gear set includes a hollow shaft, and bushing means for supporting said hollow shaft on said transmission input shaft and on said transmission output shaft.

17. A change-speed transmission, especially for motor vehicles, comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, input means operatively connected with said driving member, means including an input shaft operatively connecting said driven member with the sun gear of the first planetary gear set, transmission output means operatively connected with the planet carrier of the second planetary gear set, the planet carrier of said first planetary gear set being operatively connected with the ring gear of said second planetary gear set for rotation in unison therewith, and a plurality of engageable means to realize the different speeds of said transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and fourth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means, said first and fourth engageable means being disposed to one side of the first planetary gear set and the second and third engageable means being disposed on the other side thereof.

18. A change-speed transmission, especially for motor vehicles comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, means including a transmission input shaft operatively connecting said driven member with the sun gear of the first planetary gear set, a transmission output shaft operatively connected with the planet carrier of the second planetary gear set, the planet carrier of said first planetary gear set being operatively connected with the ring gear of said second planetary gear set for rotation in unison therewith, first engageable means disposed in the space between the first planetary gear set and said hydrodynamic device for selectively braking the planet carrier of said first planetary gear set, second engageable means for selectively braking the ring gear of said first planetary gear set, third engageable means for selectively braking in both directions of rotation the sun gear of said second planetary gear set, fourth engageable means for selectively connecting in both directions of rotation the sun gear of said second planetary gear set with the ring gear of the first planetary gear set, fifth engageable means for selectively connecting the sun gear of said second planetary gear set with the ring gear thereof, and sixth engageable means also located within said space for selectively connecting said input shaft and therewith the sun gear of said first planetary gear set with the planet carrier thereof to thereby provide a direct drive connection from said input shaft to the second planetary gear set through said first planetary gear set upon engagement of said sixth engageable means.

19. A change-speed transmission, especially for motor vehicles having a relatively stationary housing, comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, input means operatively connected with said driving member, means including an input shaft operatively connecting said driven member with the sun gear of the first planetary gear set, axial bearing means for supporting the sun gear of said first planetary gear set on the side thereof facing the hydrodynamic device against a part of said stationary housing, transmission output means operatively connected with the planet carrier of the second planetary gear set, the planet carrier of said first planetary gear set being operatively connected with the ring gear of said second planetary gear set for rotation in unison therewith, and a plurality of engageable means to realize the different speeds of said transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and forth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means.

20. A change-speed transmission, especially for motor vehicles comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, means including a transmission input shaft operatively connecting said driven member with the sun gear of the first planetary gear set, said transmission input shaft being hollow substantially over the entire length thereof, bearing means supporting said input shaft within said driving member, means for maintaining a predetermined pressure within said hydrodynamic device including ball valve means seated within an aperture provided in the end of said input shaft supported by said bearing means, a transmission output shaft operatively connected with the planet carrier of the secondary planetary gear set, means for operatively connecting the planet carrier of said first planetary gear set with the ring gear of said second planetary gear set for rotation in unison therewith, and a plurality of engageable means for realizing the different speeds of the transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and fourth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means.

21. A change-speed transmission, especially for motor vehicles comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, means including a transmission input shaft operatively connecting said driven member with the sun gear of the first planetary gear set, a transmission output shaft operatively connected with the planet carrier of the second planetary gear set, means including a hollow shaft provided with bearing bushing means securely inserted therein for operatively connecting the planet carrier of said first planetary gear set with the ring gear of said second planetary gear set for rotation in unison therewith, and a plurality of engageable means for realizing the different speeds of the transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and fourth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means, said bearing bushing means supporting said hollow shaft and being inserted into corresponding recesses provided in said transmission input and output shafts whereby corresponding annular slots are formed.

22. A change-speed transmission, especially for motor vehicles comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, means including a transmission input shaft operatively connecting said driven member with the sun gear of the first planetary gear set, a transmission output shaft operatively connected with the planet carrier of the second planetary gear set, means including a hollow shaft provided with bearing bushing means securely inserted therein for operatively connecting the planet carrier of said first planetary gear set with the ring gear of said second planetary gear set for rotation in unison therewith, and a plurality of engageable means for realizing the different speeds of the transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and fourth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means, said bearing bushing means supporting said hollow shaft and being inserted into corresponding recesses provided in said transmission input and output shafts whereby corresponding annular slots are formed, and further bushing means inserted into said corresponding recesses intermediate said first-mentioned bushing means and said input and output shafts whereby said shafts are supported on said first-mentioned bushing means with relatively large play.

23. A change-speed transmission, especially for motor vehicles comprising two planetary gear sets and a hydrodynamic device operatively connected ahead of said planetary gear sets, each of said planetary gear sets having a sun gear, a ring gear, a planet gear in meshing engagement with said sun and ring gears and a planet carrier for said planet gear, said hydrodynamic device including a driving member and a driven member, means including a transmission input shaft operatively connecting said driven member with the sun gear of the first planetary gear set, said transmission input shaft being hollow substantially over the entire length thereof, bearing means supporting said input shaft within said driving member, means for maintaining a predetermined pressure within said hydrodynamic device including ball valve means seated within an aperture provided in the end of said input shaft supported by said bearing means, a transmission output shaft operatively connected with the planet carrier of the second planetary gear set, means including a hollow shaft provided with bearing bushing means securely inserted therein for operatively connecting the planet carrier of said first planetary gear set with the ring gear of said secondary planetary gear set for rotation in unison therewith, and a plurality of engageable means for realizing the different speeds of the transmission including first engageable means for selectively braking the planet carrier of said first planetary gear set, second engageable means for selectively braking in both directions of rotation the ring gear of said first planetary gear set and the sun gear of said second planetary gear set, third engageable means for selectively connecting in both directions of rotation the sun gear of said second planetary gear set with the ring gear of the first planetary gear set as well as with the ring gear of said second planetary gear set, and fourth engageable means for selectively connecting said input shaft and therewith the sun gear of said first planetary gear set with the planet carrier thereof to thereby provide a direct drive connection from said input shaft to the second planetary gear set through said first planetary gear set upon engagement of said fourth engageable means, said bearing bushing means supporting said hollow shaft and being inserted into corresponding recesses provided in said transmission input and output shafts whereby corresponding annular slots are formed, and further bushing means inserted into said corresponding recesses intermediate said first-mentioned bushing means and said input and output shafts whereby said shafts are supported on said first-mentioned bushing means with relatively large play.

References Cited in the file of this patent

UNITED STATES PATENTS

| | | |
|---|---|---|
| 2,645,137 | Roche | July 14, 1953 |
| 2,720,124 | Polomski | Oct. 11, 1955 |
| 2,747,431 | Roche | May 29, 1956 |
| 2,856,796 | Miller | Oct. 21, 1958 |
| 2,873,621 | Simpson | Feb. 17, 1959 |
| 2,899,846 | Tuck | Aug. 18, 1959 |
| 3,038,574 | Roche | June 12, 1962 |

FOREIGN PATENTS

| | | |
|---|---|---|
| 614,340 | France | Sept. 14, 1926 |
| 727,894 | Great Britain | Apr. 13, 1955 |

UNITED STATES PATENT OFFICE
CERTIFICATE OF CORRECTION

Patent No. 3,103,832                         September 17, 1963

Hans-Joachim M. Foerster

It is hereby certified that error appears in the above numbered patent requiring correction and that the said Letters Patent should read as corrected below.

Column 8, line 24, for the claim reference numeral "15" read -- 5 --; same column 8, lines 27, 42 and 49, for the claim reference numeral "14", each occurence, read -- 4 --.

Signed and sealed this 27th day of April 1965.

(SEAL)
Attest:

ERNEST W. SWIDER
Attesting Officer

EDWARD J. BRENNER
Commissioner of Patents